Sept. 20, 1955      I. V. SCHUSTER      2,718,252
SCREW OR BOLT WITH SPRING SPLINE
Filed June 12, 1953      2 Sheets-Sheet 1
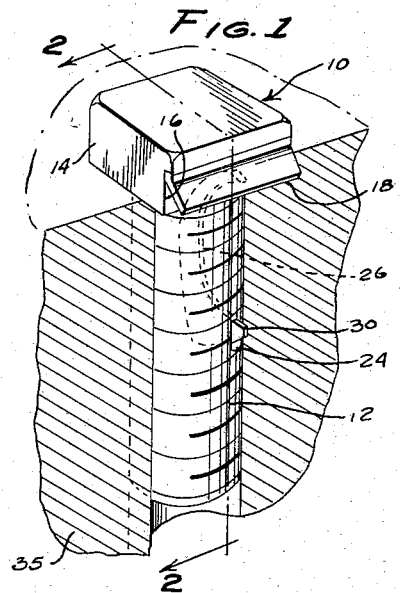
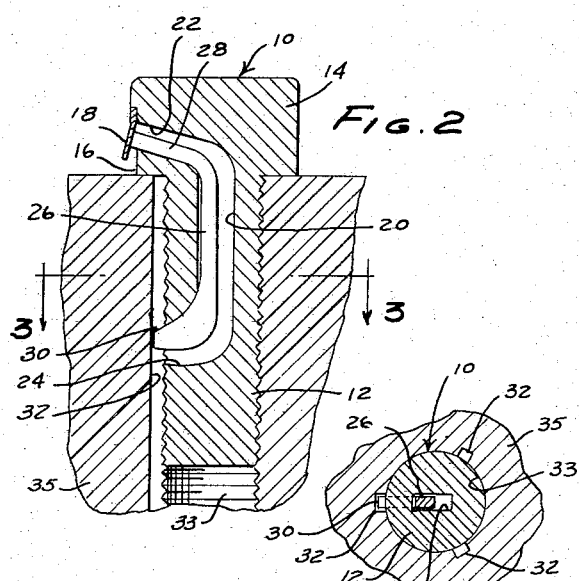
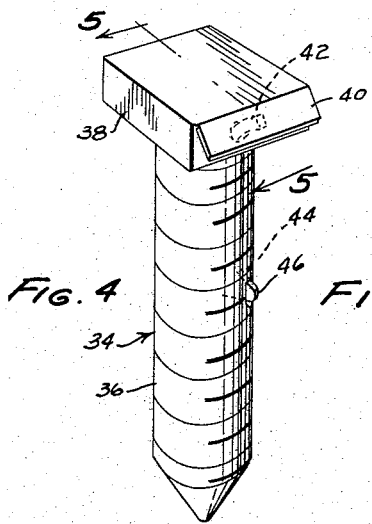
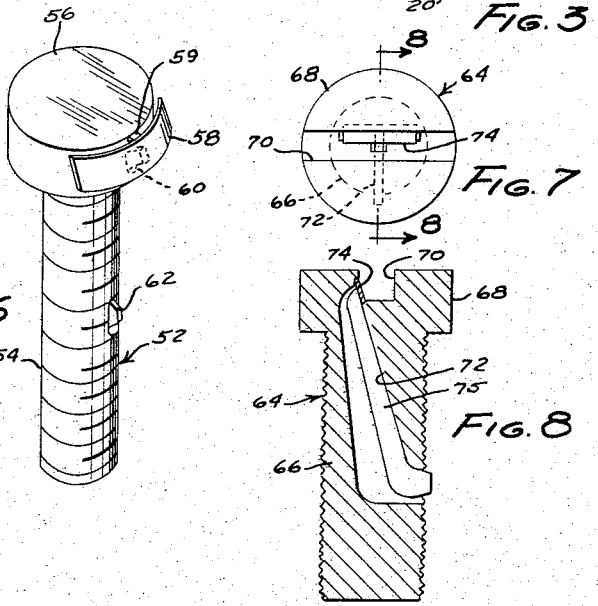
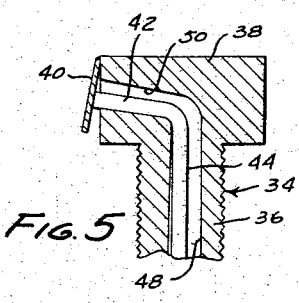
INVENTOR.
ISIDORO V. SCHUSTER
BY
McMorrow, Berman & Davidson
ATTORNEYS

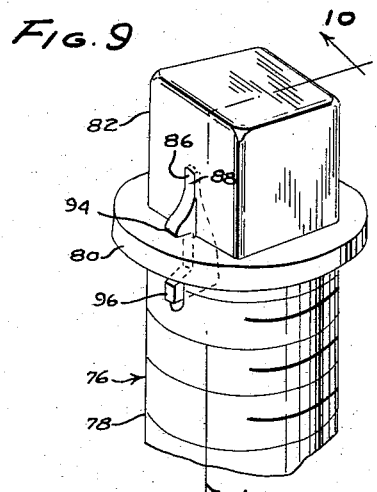
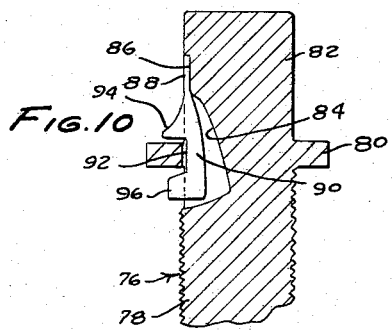
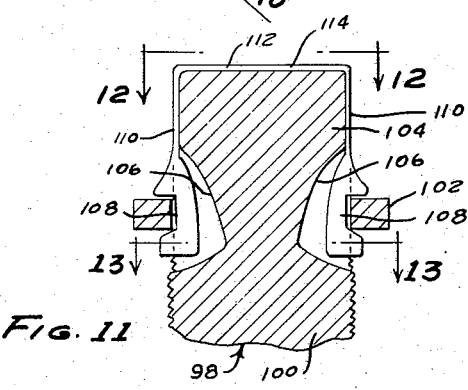
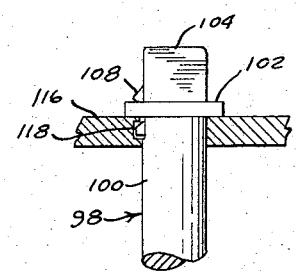
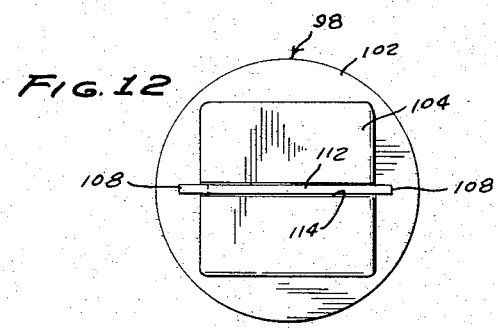
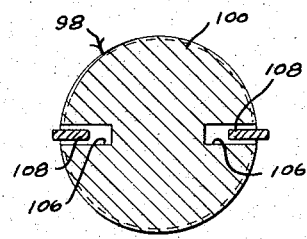

United States Patent Office 2,718,252
Patented Sept. 20, 1955

2,718,252

SCREW OR BOLT WITH SPRING SPLINE

Isidoro V. Schuster, Buenos Aires, Argentina

Application June 12, 1953, Serial No. 361,383

3 Claims. (Cl. 151—8)

This invention relates to locking devices for screws or bolts, and more particularly, has reference to a screw, bolt, or connecting pin having a spline or locking arm that is normally spring-biased radially and outwardly of the shank of the screw, to a locking position in which it is engageable in a spline-receiving groove of a nut, plate, or socket member with which the screw is engaged. The invention is characterized, in this connection, by the disposition of the spring means associated with the spline, at a location at which a hand, wrench, or other means used to rotate the screw will depress the spring means and its associated spline to an inoperative position, with said spring means exerting pressure against the spline tending to shift the same to its outer, locking position as soon as rotation of the screw has been completed and the rotating means has been removed.

I am aware that broadly speaking, it is not new to provide a locking means for a screw or bolt, engageable in a complementary locking recess of a member with which said bolt is threadedly engaged. However, the main object of the present invention is to provide an improved device of this type, wherein the locking means will be so formed and arranged relative to the head and shank of the bolt, screw, or pin as to cause the natural positioning of the bolt or screw rotating means to be effective for retaining the locking device in an inoperative position.

Other objects will appear from the following description, the claims appended thereto, and from the annexed drawings, in which like reference characters designate like parts throughout the several views, and wherein:

Figure 1 is a perspective view of a screw formed in accordance with the present invention, a plate in which said screw is threadedly engaged being illustrated fragmentarily and in section;

Figure 2 is a longitudinal sectional view through the screw, taken substantially on line 2—2 of Figure 1;

Figure 3 is a transverse sectional view on line 3—3 of Figure 2;

Figure 4 is a perspective view of a modified form of screw;

Figure 5 is a fragmentary longitudinal sectional view on line 5—5 of Figure 4;

Figure 6 is a perspective view of another modified form of screw;

Figure 7 is a top plan view of still another modification;

Figure 8 is a sectional view on line 8—8 of Figure 7;

Figure 9 is a fragmentary perspective view of still another modification;

Figure 10 is a sectional view, on a reduced scale, taken substantially on line 10—10 of Figure 9;

Figure 11 is a fragmentary longitudinal sectional view through yet another modified form;

Figure 12 is a top plan view of the form of Figure 11;

Figure 13 is a transverse sectional view on line 13—13 of Figure 11; and

Figure 14 is a reduced side elevational view of the form shown in Figure 11, as it appears when in use.

In Figures 1, 2, and 3 there is shown a first form of the invention, wherein the screw has been designated generally by the reference numeral 10.

Screw 10 includes a threaded shank 12 and a polygonal head 14 shaped for engagement by a socket wrench or the like, not shown.

Formed in one face of head 14 is a shallow depression 16, in which is seated a spring tongue 18, the top edge of which is soldered or otherwise fixedly connected to the head 14.

Fixedly secured to the spring tongue 18 is a spline or locking arm, extending within a cavity 20. Cavity 20 has a relatively elongated, midlength part extending longitudinally and centrally of the shank 12, the midlength part of said cavity merging at its upper end into a transversely extending upper end portion 22 that opens upon the shallow depression 16. The cavity, at its lower end, is extended laterally as at 24 to open upon the surface of the shank, intermediate opposite ends of said shank.

The spline has been designated by the reference numeral 26, and is formed as an elongated arm the width of which is substantially less than the width of the cavity, as shown in Figure 2, thus to permit the spline or locking arm to be shifted between the full and dotted line positions shown in Figure 2. Arm 26, at its upper end, is extended angularly as at 28, within the upper end portion 22 of the cavity 20. The lower end portion of the spline or locking arm 26 is extended laterally as at 30, the portion 30 defining a locking finger that is extendable radially and outwardly of the shank 12 of the screw, for engagement in a locking groove or recess 32, that extends longitudinally of and is in communication with a screw-receiving, threaded bore 33 of a plate, nut, or other screw-receiving member 35.

In use of the screw shown in Figures 1–3, the wrench would first be applied to the head of the screw, and application of the wrench in a natural manner will cause the spring tongue 18 to be depressed, into the plane of the face of head 14 in which the tongue 18 is mounted. As a result, the free end 30 of the spring spline will be retracted, during the rotation of the screw by the wrench or other rotating device.

When the screw has been rotated to the desired position within the member 35, the wrench is removed, and removal of the wrench will be effective to permit the spring tongue 18 to swing outwardly to the position thereof shown in Figures 1 and 2, causing the free end portion 30 to move into any one of a plurality of circumferentially spaced locking grooves or recesses 32.

In Figures 4 and 5, there is illustrated a second form of the invention, wherein the screw has been designated by the reference numeral 34, and includes a shank 36 depending from a polygonal head 38. Head 38 is adapted to be manually rotated, and accordingly, instead of a shallow recess for the spring tongue such as has been shown in Figure 1, the head 38 has a spring tongue 40 welded or otherwise fixedly secured along its upper edge to the head 38, along the top edge of one side face of the head. Spring tongue 40 is thus disposed where it will be grasped by the fingers of the hand, when the screw 34 is manually rotated, and the natural gripping of the head 38 by the fingers will cause the tongue 40 to be depressed.

Secured fixedly to tongue 40 is the angularly extended upper end 42 of a spring spline 44 having at its lower end an angular locking extension or finger 46. Spline 44 is swingable within a cavity 48 having an angular extension 50 opening upon that face of head 38 on which tongue 40 is mounted, said cavity 48 having, at its lower end, an angular extension through which the finger 46 extends.

The locking action in the form of Figures 4–5 is similar to that obtaining in the form of Figures 1–3. In other words, the rotating of the screw by a rotating means will serve to depress the spring tongue, thus to retract the locking finger of the spline. As soon as rotation is halted and the rotating means is removed, the spring tongue will spring outwardly, causing the spline to be shifted to a locking position.

In Figure 6 there is illustrated a third form of the invention wherein the screw 52 has a threaded shank 54 depending from a circular head 56. Head 56 has an arcuate spring tongue 58 concentric therewith, the spring tongue 58 extending about a part of the circumference of the head, and being connected medially between its ends to the head 56 by means of a short bight portion 59.

The arcuate spring tongue 58 is normally urged outwardly from the head 56, by reason of the spring tension of bight 59, and thus, tongue 58 has the same characteristics as the tongues 18, 40.

Secured fixedly to the rear surface of tongue 58, intermediate opposite ends of said tongue, is the upper end 60 of a spring spline having an outwardly extended locking finger 62, said spring spline being swingably mounted in a cavity such as that shown in Figure 2.

In the form of the invention shown in Figure 6, the head 56 will be gripped by a suitable rotating means, such as the fingers of the hand, and gripping of the head in this manner will serve to depress the spring tongue 58, retracting the finger 62 until such time as rotation is to cease and the screw is to be locked.

In Figures 7 and 8 there is illustrated a fourth form of the invention, wherein the screw 64 has a shank 66 depending from a head 68 formed with a diametrically extended kerf 70 adapted to receive a screwdriver bit, not shown. The cavity of the screw 64 has been designated by the reference numeral 72, and at its upper end is in communication with the bit-receiving kerf 70, said cavity opening, at its lower end, upon the side wall of the shank 66.

A spring tongue 74 is soldered or otherwise fixedly connected along its upper edge to one side wall of the kerf 70, said tongue 74 being so tensioned as to normally extend outwardly within the kerf, to a position in which it will be engaged by the inserted bit. Tongue 74 is made rigid with the upper end of a spring spline 75 having an outwardly extended locking finger at its lower end that projects through the open lower end of cavity 72.

It will be readily appreciated that when the bit is inserted in kerf 70 for the purpose of rotating the screw, the tongue 74 will be depressed, so as to retract the locking finger of the spring spline 75. When the screw has been rotated to the desired position, and the bit is removed, the tongue 74 will, by reason of the spring tension thereof, return to the position thereof shown in Figures 7 and 8, thus to cause the screw to be locked.

In Figures 9 and 10 there is shown a fifth form of the invention, wherein the screw has been designated by the reference numeral 76 and includes a shank 78 integral at its upper end with a circumferential collar 80, said collar 80 being integral with a polygonal head 82 extending upwardly therefrom.

Formed in the head 82 is a cavity 84, one end of which opens upon one face of the head 82, above collar 80, the other end of said cavity opening upon the shank of the screw below collar 80. The cavity 84, at its upper end, merges into a shallow recess 86, in which is soldered or otherwise fixedly secured a spring tongue 88. Tongue 88 is secured to the upper end of a spline 90, one side edge of which is recessed as at 92 to define, above and below the recess, lateral extensions or fingers 94, 96. The extensions 94, 96 are disposed above and below the collar 80, respectively, the extension 96 being adapted to serve as a locking finger.

It will be seen that on application of a wrench or other rotating means to the head 82, said rotating means will engage the extension 94, thus to cause the spline to be retracted. When rotation of the screw has ceased, the spring tension of the tongue 88 will assert itself, causing the spline to swing outwardly to the position thereof shown in Figures 9 and 10, in which position it will lock the screw against further rotation.

In Figures 11–14 there is shown a sixth form of the invention wherein the screw has been designated generally by the reference numeral 98 and includes a shank 100 integral at its upper end with a circumferential collar 102. Collar 102 is integral with a polygonal, upwardly extended head 104, in diametrically opposite faces of which cavities 106 are formed. Cavities 106 are identically but oppositely formed, as best shown in Figure 11, and disposed in the respective cavities are the splines 108, each of which swings inwardly and outwardly within its associated cavity between locking and unlocking positions. The splines are illustrated in their locking positions, said splines having laterally projected locking fingers at their lower or free ends, which fingers will move into complementary grooves or recesses of the member in which the screw 98 is threaded.

The splines 108 are integral or otherwise rigidly connected to the lower ends of legs 110, said lower ends of the legs 110 constituting spring tongues. At their upper ends, legs 110 are integral with the opposite ends of a transversely extended bight 112. Bight 112 is seated in a diametrically extending groove 114 formed in the top face of head 104, and merging at its opposite ends into side grooves in which the legs 110 are recessed.

It will be readily seen that when a wrench or similar tool is applied to the head 104, the splines 108 will be retracted, by reason of the engagement of said splines by the rotating device. Subsequently, when rotation has ceased, either or both of the splines will spring outwardly into a complementary locking recess or groove.

In Figure 14, the form of the invention shown in Figures 11–13 is illustrated as it appears when in use.

Thus, in Figure 14, there is illustrated a plate 116 having a screw-receiving opening formed with circumferentially spaced recesses 118. The edge of the opening of said plate 116 could be serrated throughout its circumference. Alternatively, the recesses 118 could be disposed equal distances apart about said circumference, in selected quantity.

It will be noted that either spline 108 can serve as an efficiently operating locking device, it being necessary only that one of the splines 108 engage in a recess 118.

In all forms of the invention, there is a common characteristic of importance, wherein the spline is normally spring urged to an operative, locking position, with the spring means associated with said spline being so disposed as to be depressed against the tension thereof by the means used for rotating the screw. By reason of this arrangement, the locking means will be inoperatively disposed whenever the screw is being rotated. When, however, rotation ceases the locking means will automatically move to an operative position. This speeds up the handling of the screws, and obviously, permits screws of the type illustrated to be used in exactly the same manner as screws not having the locking means shown.

It is also believed to be of importance to note that the locking spline need not necessarily be projected outwardly through the threads of the shank, and might, in many instances, be disposed on a smooth surfaced portion of the shank.

It is also believed worth noting that the screw could be used on various tools, and in various types of machinery, and wherever used, said screw would not necessarily have to be rotated to a position in which the spline thereof is aligned with a complementary locking recess or groove. Rather, vibration of the tool or machinery during use thereof would permit the screw to rotate to such an extent as would, ultimately, bring the locking finger into alignment with a locking recess. Further rotation would then, of course, be precluded.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bolt adapted to be locked in selected positions to which it is rotated within a bore provided therefor in an associated bolt-receiving element, against further rotation relative to said element, comprising: a threaded shank terminating at one end in a head adapted for gripping by a rotating means applied thereto, said bolt having a cavity extending continuously within the shank and head; a locking spline extending within said cavity, the cavity being of a transverse dimension sufficient for lateral shifting of the spline therein between a first position in which said spline is wholly recessed in the cavity, and a second, normal position in which it projects at one end out of the cavity to engage in a groove provided therefor in said associated element; and leaf spring means disposed at said head having one end rigid with the other end of the spline, said spring means having its other end anchored upon the head, the leaf spring means having a portion spaced from said other end thereof projecting laterally and outwardly of the head in the normal position of the spline, in position to be engaged by said rotating means, whereby to depress the leaf spring means responsive to gripping of the head by said rotating means, thus to shift the spline transversely within the cavity to the first position thereof for freeing the bolt for rotation relative to said associated element.

2. A bolt adapted to be locked in selected positions to which it is rotated within a bore provided therefor in an associated bolt-receiving element, against further rotation relative to said element, comprising: a threaded shank terminating at one end in a head adapted for gripping by a rotating means applied thereto, said bolt having a cavity extending continuously within the shank and head; a locking spline extending within said cavity, the cavity being of a transverse dimension sufficient for lateral shifting of the spline therein between a first position in which said spline is wholly recessed in the cavity, and a second, normal position in which it projects at one end out of the cavity to engage in a groove provided therefor in said associated element; and leaf spring means disposed at said head having one end rigid with the other end of the spline, said spring means having its other end anchored upon the head, the leaf spring means having a portion spaced from said other end thereof projecting laterally and outwardly of the head in the normal position of the spline, in position to be engaged by said rotating means, whereby to depress the leaf spring means responsive to gripping of the head by said rotating means, thus to shift the spline ransversely within the cavity to the first position thereof for freeing the bolt for rotation relative to said associated element, said head having a shallow depression formed therein, said depression extending transversely of the head from side to side thereof and communicating intermediate its ends with said cavity, the leaf spring being extended within said depression transversely of the head and spline, one edge of the leaf spring being fixedly secured to the wall of the depression, whereby to effect said anchoring of the leaf spring means to the head.

3. A bolt adapted to be locked in selected positions to which it is rotated within a bore provided therefor in an associated bolt-receiving element, against further rotation relative to said element, comprising: a threaded shank terminating at one end in a head adapted for gripping by a rotating means applied thereto, said bolt having a cavity extending continuously within the shank and head; a locking spline extending within said cavity, the cavity being of a transverse dimension sufficient for lateral shifting of the spline therein between a first position in which said spline is wholly recessed in the cavity, and a second, normal position in which it projects at one end out of the cavity to engage in a groove provided therefor in said associated element; and leaf spring means disposed at said head having one end rigid with the other end of the spline, said spring means having its other end anchored upon the head, the leaf spring means having a portion spaced from said other end thereof projecting laterally and outwardly of the head in the normal position of the spline, in position to be engaged by said rotating means, whereby to depress the leaf spring means responsive to gripping of the head by said rotating means, thus to shift the spline transversely within the cavity to the first position thereof for freeing the bolt for rotation relative to said associated element, said head having a kerf adapted to receive a provided bit on the rotating means, said kerf extending diametrically of the head and said cavity opening at one end within the kerf, said leaf spring means being extended along one wall of the kerf and normally projecting outwardly from said one wall into the kerf, the leaf spring means extending transversely of and being rigid intermediate its ends with said spline to provide for said rigid connection between the leaf spring means and the spline.

References Cited in the file of this patent

UNITED STATES PATENTS

| 2,318,356 | Ball | May 4, 1943 |

FOREIGN PATENTS

| 487,517 | Great Britain | June 22, 1938 |